United States Patent [19]

Heller et al.

[11] Patent Number: 6,065,841

[45] Date of Patent: May 23, 2000

[54] COMPUTER MONITOR HOOD

[76] Inventors: Philip Heller, 216 Coldwater Ave., Toronto, Canada, M5N 1Y3; David Heller, 41 Ezrat Tora, Jeruselam, Israel

[21] Appl. No.: 09/259,041

[22] Filed: Mar. 1, 1999

Related U.S. Application Data

[63] Continuation-in-part of application No. 08/774,013, Dec. 26, 1996, Pat. No. 5,900,979, which is a continuation-in-part of application No. 08/488,908, Jun. 9, 1995, Pat. No. 5,589,985.

[51] Int. Cl.[7] .............................. G02B 27/00; A04N 5/64
[52] U.S. Cl. ...................... 359/609; 359/601; 348/842
[58] Field of Search ................................ 359/601–614; 348/834–842

[56] References Cited

U.S. PATENT DOCUMENTS

| | | | |
|---|---|---|---|
| 4,784,468 | 11/1988 | Tierney | 359/601 |
| 5,243,463 | 9/1993 | Waintroob | 359/601 |
| 5,528,424 | 6/1996 | Lentz et al. | 359/612 |
| 5,900,979 | 5/1999 | Heller et al. | 359/609 |
| 5,905,546 | 5/1999 | Giulie et al. | 348/842 |

*Primary Examiner*—Thong Nguyen
*Attorney, Agent, or Firm*—Donald E. Hewson

[57] ABSTRACT

A computer monitor hood is provided having top, left side, and right side shading panels. The computer monitor hood is formed as a monolithic structure, and is made of rigid material having elastic memory. When it is first molded, the bottom edges of the left side and right side shading panels are closer together than their top edges so that, when the computer monitor hood is in place on a computer monitor, the left side and right side shading panels are biased into frictional contact with the computer monitor as a consequence of the elastic memory attempting to restore the left side and right side shading panels to their unstressed position. Thus, the computer monitor hood may be placed in any selected position on a computer monitor as a consequence of the left side and right side shading panels being biased towards and in frictional contact with the sides of the computer monitor.

6 Claims, 4 Drawing Sheets

COMPUTER MONITOR HOOD

CROSS-REFERENCE

This application is a Continuation-In-Part application of Ser. No. 08/774,013 filed Dec. 26, 1996, now U.S. Pat. No. 5,900,979; which was a Continuation-In-Part of Ser. No. 08/488,908 filed Jun. 9, 1995, now U.S. Pat. No. 5,589,985 issued Dec. 31, 1996.

FIELD OF THE INVENTION

This invention relates to computer monitor hoods for shading the screen of a computer monitor from ambient light. More particularly, this invention relates to computer monitor hoods which are not attached or fixed to the monitor; but whose placement and/or balance, when in place on a computer monitor, can be adjusted.

BACKGROUND OF THE INVENTION

It is common in offices, and other environments where computers are used, to have reasonably intense light from overhead lighting fixtures and windows, in order to sufficiently illuminate an office. Due to the intensity of this light, and also due to the location of overhead lighting fixtures and windows, the light is often perceived as glare on a computer monitor screen. This glare can make it difficult, if not impossible, to see the computer monitor screen properly. It is, therefore, necessary to preclude as much of this light as possible from reaching the computer monitor screen in such a manner that it is reflected off the screen as glare.

In many instances, it may be possible to close curtains or blinds over a window in order to block much of the glare-causing emanating from a window; however, this reduces the amount of ambient light in the room, which might be unacceptable. It is generally not possible to block out the light from overhead lighting fixtures, but it is possible to turn off the overhead lights. However, even this step is often unacceptable.

DESCRIPTION OF THE PRIOR ART

U.S. Pat. No. 5,121,253 to WAINTROOB discloses a visor for a computer monitor wherein the visor has a left wall, a right wall, and a top wall, and the visor is attached to a computer monitor by means of VELCRO™ or other hook and loop two-part fastening devices, which is highly disadvantageous, as it requires permanent attachment of one portion of the VELCRO™ to the computer monitor. The position of the visor on a computer monitor is only very slightly adjustable, depending on the width of the VELCRO™, or on the amount of VELCRO™ used, which is also disadvantageous, since it is necessary to be able to adjust a visor in order to properly shield the computer monitor screen from glare. It is also important to be able to permit proper placement on a variety of computer monitors, which is not readily achievable by WAINTROOB. Particularly, it is highly desirable to be able to angularly adjust the visor by tilting the visor downwardly at its front such that the front edge of the visor is lower than the top edge of the computer monitor. Such angular adjustment of the visor is not taught in the WAINTROOB patent.

U.S. Pat. No. 5,243,463, also to WAINTROOB, is a Continuation-In-Part of the earlier patent, having all of the same disadvantageous features.

U.S. Pat. No. 5,233,468 to McNULTY discloses a computer hood that also has a left wall, a right wall, and a top wall. This computer hood attaches to a computer monitor by means of a retaining device in the form of a pair of clips extends outwardly at right angles to each of the left and right side walls at the bottom thereof, such that each clip engages a lower front portion of the front of the monitor. Additionally, a back wall catches a rear-facing surface of the monitor, so as to keep the visor in place. The position of the visor on a computer monitor, including the angular orientation, is not adjustable in terms of position, which is greatly disadvantageous, as discussed above.

U.S. Pat. No. 5,237,453 to JONES discloses a light absorbing visor for video display monitors, wherein a thin flexible sheet of plastic such as polyvinylchloride is curved and otherwise shaped to conform to the two sides and top of a computer monitor. The visor is secured to the monitor by means of an adhesive strip on the visor, or alternatively by VELCRO™, and is therefore not adjustable in terms of positioning. It is not taught in the Jones patent to angularly adjust the visor on the monitor.

HELLER et al U.S. Pat. No. 5,589,985 issued Dec. 31, 1996 teaches a computer monitor hood having a top shading panel and left and right side shading panels. The computer monitor hood may be folded for shipping and storage; and, when unfolded and put in place over a computer monitor, it is positioned in place and held in stable position by placement of a counterweight, or counterweights. The at least one counterweight is placed on a counterweight receiving portion of the computer monitor hood, and each of the counterweight receiving portion and the counterweight have slip-resistant surfaces. Several different embodiments utilizing counterweights are disclosed. In a further embodiment, a compliant layer of easily displaceable material is disposed on the underside of the top shading panel, and that compliant layer conforms to the shape of the contacted portion of the monitor on which the computer monitor hood is placed.

HELLER et al Ser. No. 08/774,013 filed Dec. 26, 1996, now U.S. Pat. No. 5,900,979; which was a Continuation-In-Part of Ser. No. 08/448,908 filed Jun. 9, 1995, noted above, teaches a further computer monitor hood in which the left and right side shading panels are biased towards each other. The biasing means comprises spring members each having an arm which is operatively connected to the top shading panel and another arm which is operatively connected to the respective left or right side shading panel.

OBJECTS OF THE INVENTION

It is an object of the present invention to provide a computer monitor hood that is placeable on a computer monitor without being attached to the computer monitor.

It is another object of the present invention to provide a computer monitor hood that is readily adjustable in terms of fore-aft and angular placement on a computer monitor.

SUMMARY OF THE INVENTION

The present invention provides a computer monitor hood for use in conjunction with a computer monitor having a top surface, left and right side surfaces, and a forwardly facing screen. The computer monitor hood comprises a top shading panel having an outwardly facing surface, a monitor facing surface, and front, rear, left, and right side edges. Left and right side shading panels are provided, each having an outwardly facing surface, a monitor facing surface, and front, rear, top, and bottom edges. The left and right side shading panels are operatively attached at their respective top edges to the top shading panel at the left and right side edges thereof, respectively, and thus each of the left and right side shading panels depends downwardly from the respective side edge of the top shading panel. The computer monitor hood has a front-to-rear main axis. The top shading panel and the left and right side shading panels are formed as a monolithic structure which is made of a rigid material having elastic memory. The left and right side shading panels have been formed in a manner such that, when they are in their unstressed position, their respective bottom edges are closer together than their respective top edges. When the computer monitor hood of the present invention is in place on a computer monitor, a portion of the monitor facing surface of the top shading panel rests on a contacted portion of the top surface of the computer monitor, and the bottom edges of the left and right side shading panels are further apart than they were when the monolithic structure comprising the top shading panel and the left and right side shading panels was in its unstressed position. Thus, a portion of each of the monitor facing surfaces of the left and right side shading panels is biased into frictional contact with a portion of the left and right side surfaces, respectively, of the computer monitor as a consequence of the elastic memory of the material of the monolithic structure attempting to restore the left and right side shading panels to their unstressed position. Therefore, placement of the computer monitor hood is permitted on a computer monitor such that the top, left side, and right side shading panels may each project further forwardly on the computer monitor than the computer monitor screen by a selected amount, so as to thereby shade the computer monitor screen.

The present invention also provides that the computer monitor hood may further comprise an elongate securing means which is adapted to be passed around the top, left side, and right side shading panels when each of the left and right side shading panels has been forced into a position which is proximate the monitor facing surface of the top shading panel. The securing means has a hoop stress axis which, when the securing means is in place around the top, left side, and right side shading panels, the hoop stress axis is parallel to the front-to-rear main axis of the computer hood. Thus, the computer monitor hood may be maintained in a collapsed condition with the left and right side shading panels each being proximate the monitor facing surface of the top shading panel as a consequence of the reactive hoop stress of the securing means acting against the elastic memory of the material of the computer monitor hood as it attempts to restore the left and right side shading panels to their unstressed position.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

It is preferable to have a computer monitor hood that may be placed on, or generally supported by, the computer monitor, without permanent attachment to the computer monitor. It is also desirable that the computer monitor hood is adjustable to fit a variety of computer monitors and also that is adjustable in terms of placement on a computer monitor to provide a suitable amount of shading of the forwardly facing screen of the computer monitor, depending on the position of the overhead lighting.

Reference will now be made to FIGS. 1 through 4, which show several embodiments of prior art computer monitor hoods as taught in HELLER et al U.S. Ser. No. 08/488,908 filed Jun. 9, 1995, now U.S. Pat. No. 5,589,985 issued Dec. 31, 1996 and copending application Ser. No. 08/774,013, each referenced above.

Figure 1:
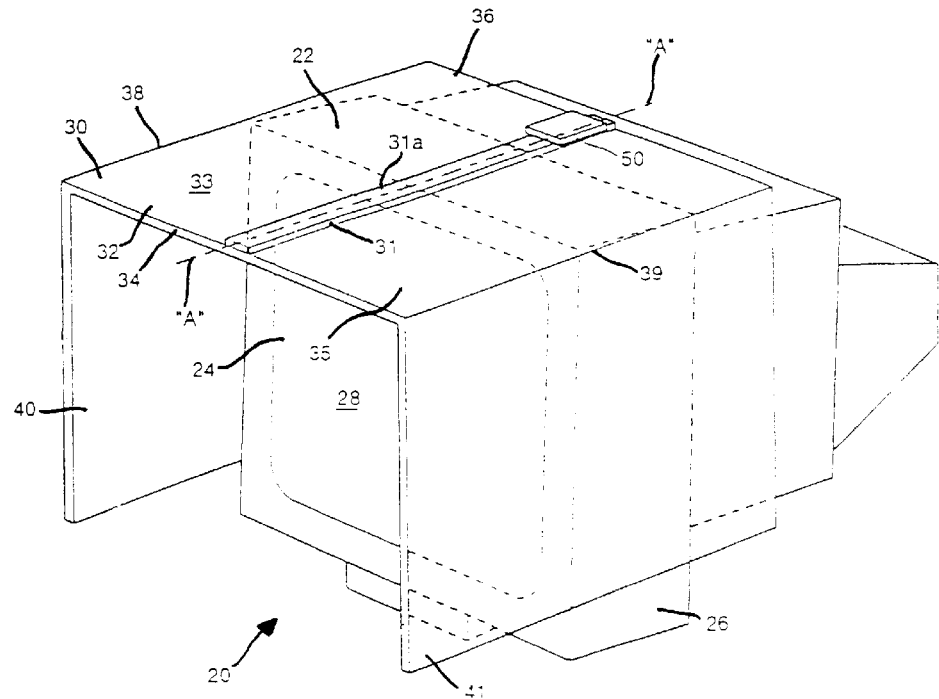
FIG. 1 is a perspective view of a computer monitor with a prior art computer monitor hood of in place thereon.

Turning first to FIG. 1, there is shown a computer monitor hood 30 in place on a computer monitor having a top surface 22, a left side surface 24, a right side surface 26, and a forwardly facing screen 28.

The computer monitor hood 30 comprises a substantially planar top shading panel 32, having a front edge 34, a rear edge 36, left and right side edges 38, 39, an outwardly facing surface 33, and a monitor facing surface 35. Substantially planar left and right side shading panels 40 and 41 are affixed to the top shading panel 32 so as to depend from the left and right side edges 38, 39 thereof, respectively. Preferably, the left and right side shading panels 40 and 41 are disposed in generally vertically oriented relation to the top shading panel 32, so as to be juxtaposed to the respective of the left and right side surfaces 24 and 26 of the computer monitor 20.

The computer monitor hood 30 has a front-to-rear main axis "A" oriented in generally parallel relation to the parallel left and right side edges 38 and 39 of the top shading panel.

In the prior art embodiment of FIG. 1, a counterweight 50 is selectively manually placeable on the computer monitor hood 30 in any one of a plurality of front-to-rear positions, so as to permit the counterweight 50 to balance the computer monitor hood 30 on the computer monitor 20. Proper balancing of the computer monitor hood 30 is important as the computer monitor hood 30 must extend forwardly from the front of the computer monitor 20 so as to shade the forwardly facing screen 28 of the computer monitor 20, which forward extension tends to cause a forward imbalance of the computer monitor hood 30. It is also highly desirable to have the front edge 34 of the top shading panel 32 situated so as to be as low as is needed to provide as much shading as possible for the screen 28. The computer monitor hood 30 is placeable on the computer monitor 20 in angularly adjustable relation so as to permit the front edge 34 to be generally aligned with the top of the screen 28. Such alignment will, of course, be dependent on the specific user sitting in front of the computer monitor 20. The computer monitor hood 30 must therefore be attached or supported in some stable manner, such that it will remain in place during use, when the computer monitor hood 30 is placed forwardly on a computer monitor 20.

In this first prior art embodiment, the counterweight 50 is selectively manually placeable on the computer monitor hood 30 in any one of a plurality of front-to-rear positions on a counterweight receiving portion 31. The counterweight receiving portion 31 is disposed on the outwardly facing surface 33 of the top shading panel 22, and has a first slip-resistant surface 31a thereon, which slip-resistant surface 31a may be made from a high friction material such as natural or synthetic rubber, sponge rubber, or rough cloth material such as felt, among others. The counterweight receiving portion 31 is preferably generally centrally located on the outwardly facing surface 33 of the top shading panel 32 so as to be oriented in a direction generally parallel to the front-to-rear main axis "A".

The counterweight 50 has a second slip-resistant surface disposed thereon, which second slip-resistant surface may also be made from a high friction material such as natural or synthetic rubber, sponge rubber, or rough cloth material such as felt, among others. Thus, the first and second slip-resistant surfaces retain the counterweight 50 in any selected position. The counterweight 50 may of course be manually moved and placed at any selected one of said plurality of front-to-rear positions, as desired, at any time.

Figure 2:
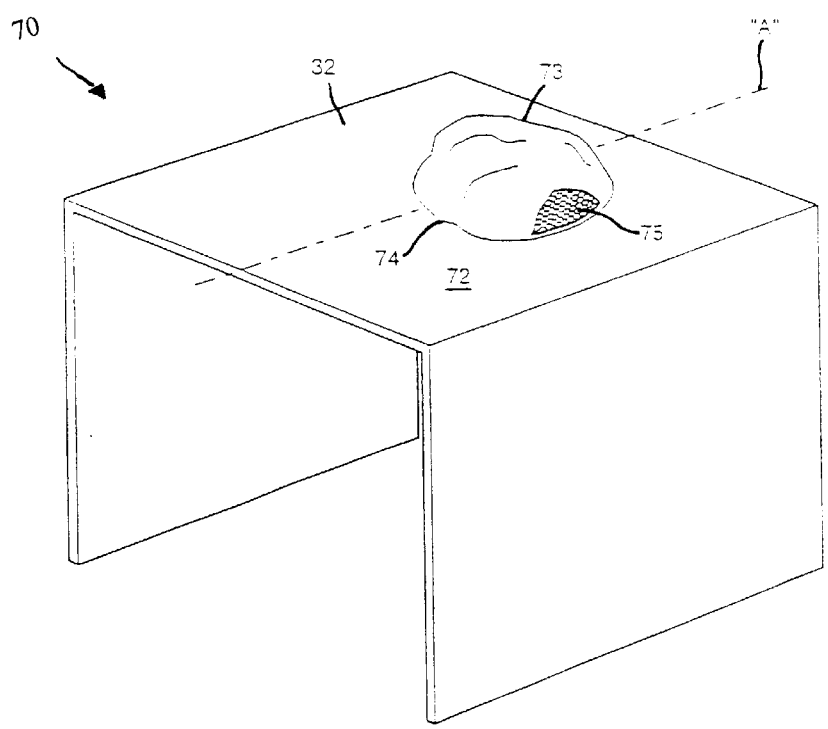
FIG. 2 is a perspective view of an alternative prior art computer monitor hood.

In another prior art embodiment as shown in FIG. 2, a computer monitor hood 70 comprises a top shading panel 32 having a high friction top surface 72. A suitable material for the top surface 72 would include felt and the like. A counterweight 73 comprises a pliable high friction fabric material outer shell 74 retaining therein an amount of fragmentary material 75, such as dried beans, shot, sand, and so on. The counterweight 73 may be placed essentially anywhere on the top shading panel 32 in order to properly balance the computer monitor hood 30 on a computer monitor, with the high friction top surface 72 retaining the counterweight 73 in substantially non-moving relation.

Figure 3:
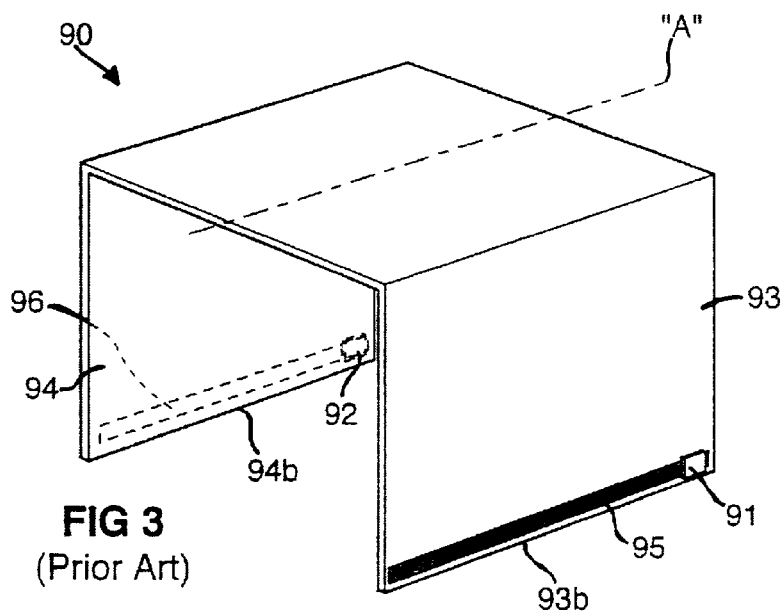
FIG. 3 is a perspective view of yet another prior art computer monitor hood.

In yet another prior art embodiment, as shown in FIG. 3, a computer monitor hood 90 comprises a first counterweight 91 that is selectively manually placeable in any one of a plurality of front-to-rear positions on a first counterweight receiving portion 95 disposed on the right side shading panel 93, and a second counterweight 92 that is selectively manually placeable in any one of a plurality of front-to-rear positions on a second counterweight receiving portion 96 disposed on the left side shading panel 94, in any one of a plurality of front-to-rear positions, so as to permit the first and second counterweights 91, 92 to co-operatingly balance the computer monitor hood 90 on a computer monitor. Various mounting means, such as VELCRO™ or a magnetic mounting means may be used to retain the first and second counterweights 91, 92 in place. Preferably, the first counterweight 91 is disposed on the right side shading panel 93 along the bottom edge 93b thereof, and the second counterweight 92 is disposed on the left side shading panel 94 along the bottom edge 94b thereof, when the computer monitor hood is in place on a computer monitor. In this manner, the first and second counterweights 91 and 92 are disposed below the centre of gravity, and also below any point of supporting contact, of the computer monitor hood 90 on a monitor. Thus, points of supporting contact are potentially pivot points of the computer monitor hood 90. Accordingly, the computer monitor hood 90 tends to be stable when in place on a computer monitor. A further advantage of mounting the first and second counterweights 91 and 92 along the bottom edge of the left and right side shading panels 93 and 94 is that the centre of gravity of the computer monitor hood 90 is lower than if the first and second counterweights 91 and 92 were mounted on top of the computer monitor hood 90.

Figure 4:
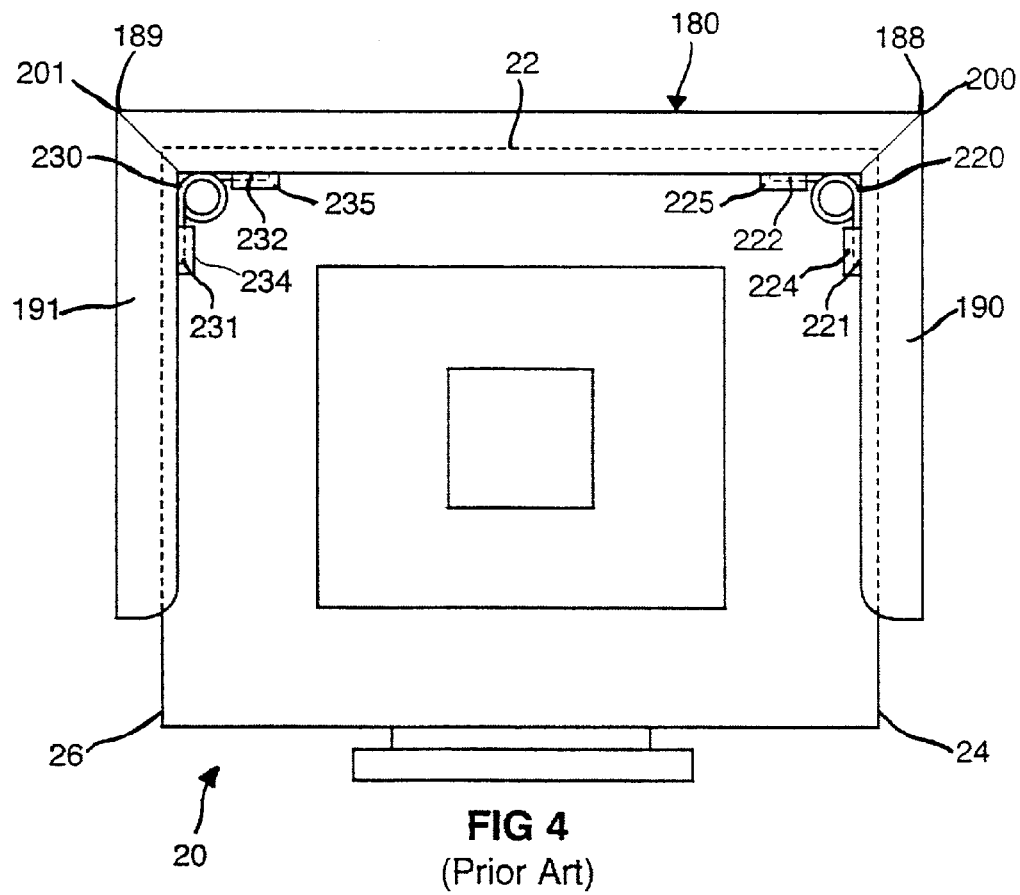
FIG. 4 is a rear elevational view of a further prior art computer monitor hood.

Reference will now be made to FIG. 4 which shows yet another embodiment of a prior art computer monitor hood 180. The computer monitor hood 180 is also for use in conjunction with the computer monitor 20, having a top surface 22, a left side surface 24, a right side surface 26, and a forwardly facing screen 28. The computer monitor hood 180 comprises a top shading panel 182, a left side shading panel 190, and a right side shading panel 191. The substantially planar left and right side shading panels 190, 191 are operatively attached at their respective top edges 200, 201 to the top shading panel 182 at the left and right side edges 188, 189 of the top shading panel 182, respectively, so as to each depend from the respective side edges 188, 189 thereof. Preferably, the left and right side shading panels 190, 191 are disposed in generally vertically oriented relation so as to be juxtaposed to the respective of the left and right side surfaces 24, 26 of the computer monitor 20.

In order to provide for easy storage and transportation of the computer monitor hood 180, the left side shading panel 190 and the right side shading panel 191 are foldably movable between respective in-use shading positions and respective storage positions. When the computer monitor hood 180 is in use, the left and right side shading panels 190, 191 are disposed in their respective in-use shading positions, as is shown in FIG. 4.

It can be seen that the computer monitor hood 180 would not stay in place on the computer monitor 20 in a manner as described above, without being held in place by the left and right side shading panels 190, 191 being biased against the left and right side surfaces 24, 26, respectively, of the computer monitor 20.

In the prior art embodiment of a computer hood, as shown in FIG. 4, the biasing means comprises a first torsion coil spring 220 and a second torsion coil spring 230. The first torsion coil spring 220 has a first arm portion 221 and a second arm portion 222. Similarly, the second torsion coil spring 230 has a first arm portion 231 and a second arm portion 232. The first arm portion 221 of the first torsion coil spring 220 is inserted into a cooperating socket 224 in the left side shading panel 190 and the second arm portion 222 of the first torsion coil spring 220 is inserted into a cooperating socket 225 in the top shading panel 180. Similarly, the first arm portion 231 of the second torsion coil spring 230 is inserted into a cooperating socket 234 in the right side shading panel 191 and the second arm portion 232 of the second torsion coil spring 230 is inserted into a cooperating socket 235 in the top shading panel 180. The first and second arm portions 221, 222, 231, 232 of the first torsion coil spring 220 and the second torsion coil spring 230 are thereby operatively connected to the appropriate shading panel.

In this above described manner, the left side shading panel 190 and the right side shading panel 191 are each biased towards each other so as to bias the left and right side shading panels 190, 191 into frictional contact with the left side surface 24 and the right side surface 26, respectively, of the computer monitor 20.

Figure 5:
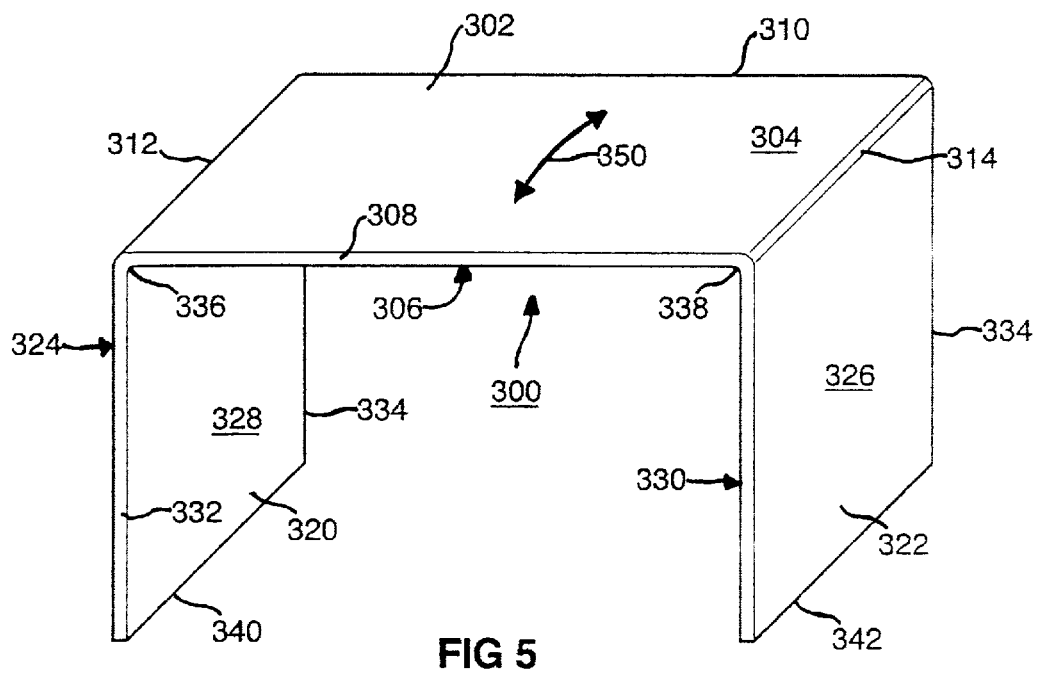
FIG. 5 is perspective view of a computer monitor hood in keeping with the present invention.

Turning now to FIGS. 5 though 7, a computer monitor hood 300 is shown, in keeping with the present invention. In this case, the computer monitor hood 300 comprises a top shading panel 302 having an outwardly facing surface 304, a monitor facing surface 306, a front edge 308, a rear edge 310, a left side edge 312, and a right side edge 314. Left and right side shading panels 320 and 322, respectively, have outwardly facing surfaces 324 and 326, respectively, monitor facing surfaces 328 and 330, respectively, as well as front edges 332 and rear edges 334. Each of the left and right side shading panels 320 and 322 is operatively attached at its respective top edges 336 and 338 to the top shading panel 302 at its left and right side edges 312 and 314, respectively. Thus, each of the left and right side shading panels 320 and 322 depends downwardly from the respective side edges 312, 314 of the top shading panel 302. Left side shading panel 320 has a bottom edge 340, and right side shading panel 322 has a bottom edge 342. There is a front-to-rear main axis shown by arrow 350.

The entire structure of the top shading panel 302 and the left and right side shading panels 320 and 322, respectively, is formed as a monolithic structure. That monolithic structure is made of a rigid material which has elastic memory.

Typically, the monolithic structure of the top, left side, and right side shading panels 302, 320, 322 of the computer monitor hood 300 is formed of a plastics material having elastic memory. The plastics material is typically one of polyethylene, polypropylene, copolymers of polyethylene and polypropylene, vinyl, (acrylonitrile-butadiene-styrene (ABS), nylon, urethane, and mixtures thereof. Also, typically, the manner in which the computer monitor hood of the present invention is formed is generally by molding, being one of the processes of injection molding, blow molding, and slush molding.

Figure 6:
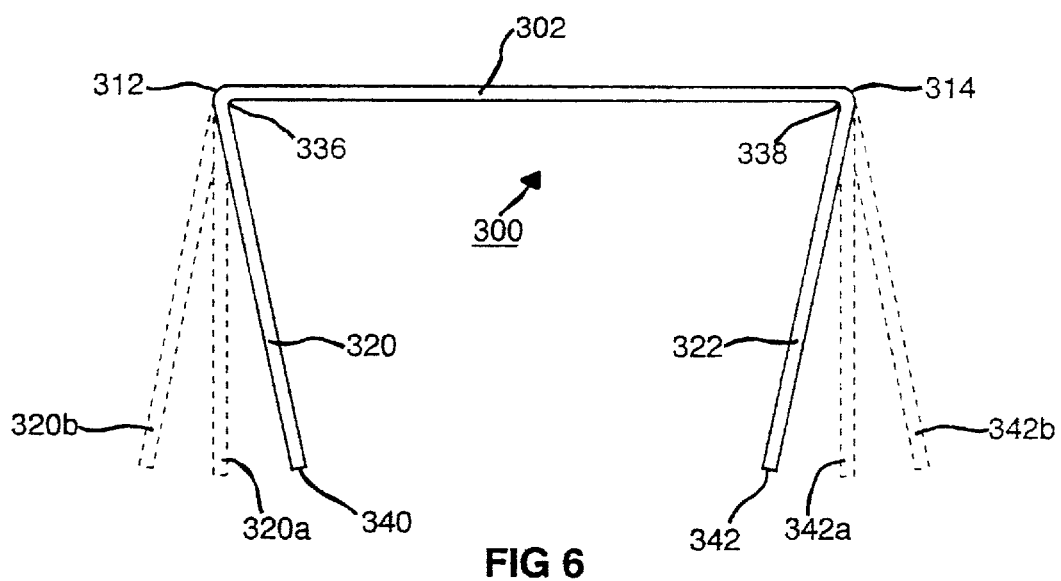
FIG. 6 is an elevational view of a computer monitor hood in keeping with the present invention showing the side shading panels in alternative positions.

Referring particularly to FIG. 6, it will be noted that the left and right side shading panels 320 and 322 shown in solid lines are the configuration of the monolithic structure comprising the top shading panel 302 and left and right side shading panels 320, 322, as they have been formed or molded and, as such, the configuration shown in solid lines in FIG. 6 shows particularly the left and right side shading panels when they are in their unstressed position. It will be noted that the respective bottom edges 340, 342 of the left and right side shading panels, 320, 322, respectively, are closer together than their respective top edges 336, 338.

Generally, the width of the shading panel 302 is chosen so as to be essentially or substantially equal to, but just slightly wider than, the width of most computer monitors having any given computer monitor screen size. Thus, typically, a computer monitor hood may be molded to fit most fifteen inch computer monitors, or to fit most seventeen inch computer monitors, and so on.

In any event, when the computer monitor hood is in place on a computer monitor, the left and right side shading panels 320, 322 will assume a position much the same as shown in FIG. 6 in dashed lines at 320a and 322a, respectively. In that position, it will be seen that a portion of the monitor facing surface 306 of the top shading panel 302 will rest on a contacted portion of the top surface of the computer monitor, such as the computer monitor 20 shown in FIG. 1. Obviously, as seen in FIG. 6, when the left and right side shading panels 320, 322 assume the positions shown by 320a and 322a, respectively, the respective bottom edges 340 and 342 are further apart than when in their unstressed position shown by solid lines in FIG. 6. The distance between the bottom edges 340 and 342 when the computer monitor hood is in place on a computer monitor will be more or less the same distance as the width of the top shading panel 302.

In order to put the computer monitor hood into place, it is a simple matter to grasp the bottom edges 340 and 342 of the respective left and right side shading panels 320 and 322, and pull them a bit further apart than the width of the computer monitor, so that they assume the positions shown in dashed lines in FIG. 6 at 320b and 322b, respectively. Then, after the surface 306 contacts the top surface of the computer monitor, the force by which the left and right side shading panels 320 and 322 have assumed the positions 320b and 322b, respectively, may be relaxed so that the left and right side shading panels will assume the positions shown by 320a and 322a, respectively.

Obviously, then a portion of each of the monitor facing surfaces 328, 330 of the left and right side shading panels 320, 322, respectively, will be biased into frictional contact with a portion of the left and right side surfaces, respectively, of the computer monitor as a consequence of the elastic memory of the monolithic structure attempting to restore the left and right side shading panels 320, 322 to their unstressed position. Accordingly, the computer monitor hood 300 may be placed on a computer monitor in such a manner that the top shading panel 302 and the left and right side shading panels 320, 322, respectively, may each project further forwardly at their front edges 308 and 332 on the computer monitor than the computer monitor screen. The amount by which the front edges 308 and 332 of the top and side shading panels projects further forwardly than the computer monitor screen may be selected precisely. Thus, the computer monitor screen will be shaded appropriately, as desired by the individual user.

Of course, each of the computer monitor contacting surfaces 306, 328, and 330 may be coated or treated in such a manner as to more particularly slip-resistant than what might otherwise be the case. For example, a layer of foam material, or even strips of foam material, may be placed on each of the surfaces 306, 328, and 330, or they may be molded with a pebbled, ridged, or cross-hatched pattern in those surfaces.

Figure 7:
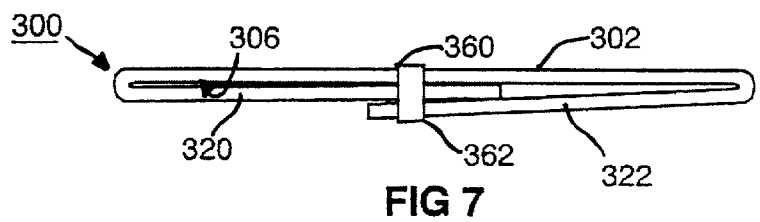
FIG. 7 is an elevational view of a computer monitor hood in keeping with the present invention when in its collapsed configuration, and having a securing means in place.

For ease of shipping and storage, in particular, it may be desirable to provide means whereby the computer monitor hood 300, in keeping with the present invention, may be shipped and/or stored in a more-or-less collapsed configuration such as is shown in FIG. 7. In such a collapsed configuration, each of the left and right side shading panels 320, 322, respectively, is forced into a position which is proximate the monitor facing surface 306 of the top shading panel 302, as shown in FIG. 7.

There is provided a securing means 360, which takes the form of a band or belt. Specifically, the securing means 360 is essentially non-elastic, and is such that a hoop stress will develop in the securing means 360 as a reaction to the elastic memory of the material of the computer monitor hood 300 as it attempts to restore the left and right side shading panels 320 and 322 to the their unstressed position as shown in solid lines in FIG. 6. Thus, the securing means 360 has a hoop stress axis shown by arrow 362. The hoop stress axis 362 will be parallel to the front-to-rear main axis 350 of the computer monitor hood 300 when the securing means 360 is in place.

Obviously, reactive hoop stress is developed in the securing means 360; and, because the securing means 360 is essentially non-elastic, the hoop stress manifests itself along the hoop stress axis 362 along the entire length of the securing means 360. The securing means may be as simple as a rope which is tied in place; more particularly, the securing means 360 may be such as a belt of nylon webbing, or other suitable material. The means by which the securing means is cinched or otherwise secured in place is outside the scope of this invention; the essential feature is that a reactive hoop stress is developed as a consequence of the securing means acting against the elastic memory of the material of the computer monitor as it attempts to restore the left and right side shading panels 320, 322 to their unstressed position.

Figure 8:
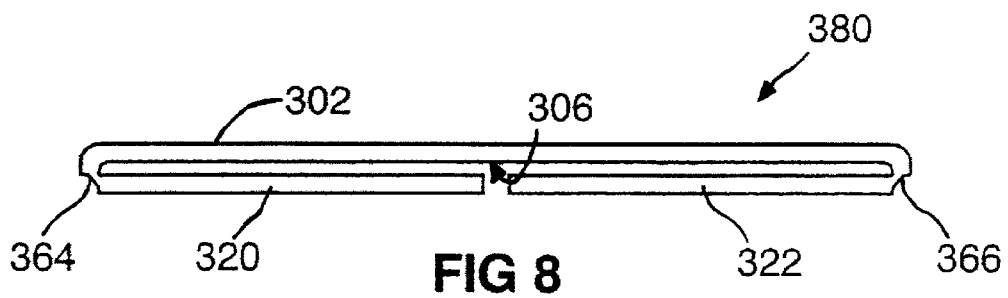
FIG. 8 is an elevation view of a further embodiment of a computer monitor hood in keeping with the present invention when in its collapsed condition.
Figure 9:
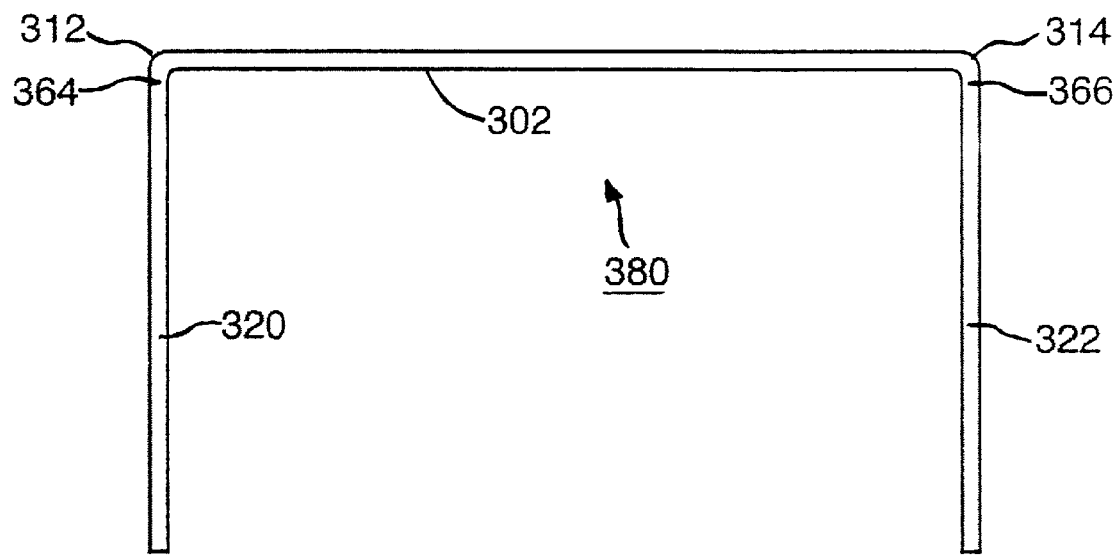
FIG. 9 is an elevational view of the computer monitor hood of FIG. 8 when in its operating configuration.

In a further embodiment of computer monitor hood 380, as shown in FIGS. 8 and 9, the computer monitor hood may be molded with a pair of creases 364 and 366, which are located slightly below the left and right side edges 312 and 314 of the top shading panel 302. The creases 364 and 366 are molded in the outer surface of the left and right side shading panels 320 and 322, respectively. When the computer hood 380 is injection molded, it may be molded essentially in the configuration shown in FIG. 7—that is, with the left and right side shading panels 320 and 322 being folded essentially proximate the monitor facing surface 306 of the top shading panel 302. What is then achieved is that the structure of the computer monitor hood 380, in the regions defined by the creases 364 and 366, essentially provides a structure similar to that of a living hinge, but with elastic memory. Accordingly, the computer monitor hood 380 may be shipped essentially in its collapsed configuration as shown in FIG. 8, but without the necessity for the securing means 360 being provided. The computer monitor hood 380 may be opened up in the manner shown in FIG. 9 to assume the configuration as shown in FIG. 9. The creases 364 and 366 are then substantially closed.

There has been described a computer monitor hood which requires no additional elements such as a counterweight, or biasing means such as a pair of spring elements, in order to maintain a computer monitor hood on a computer monitor. Rather, the computer monitor hood of the present invention relies upon the elastic memory of the material of the monolithic structure from which it has been molded, provided that the unstressed position of the left and right side shading panels is such that their bottom edges are closer together than their respective top edges.

Other modifications and/or alterations may be used in the design and/or manufacture of computer monitor hoods in keeping with the present invention, without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially equal is intended to mean equal, nearly equal and/or exhibiting the characteristics of equality.

What is claimed is:

1. A computer monitor hood for use in conjunction with a computer monitor having a top surface, left and right side surfaces, and a forwardly facing screen, said computer monitor hood comprising:

a top shading panel having an outwardly facing surface, a monitor facing surface, front, rear, left, and right side edges;

left and right side shading panels each having an outwardly facing surface, a monitor facing surface, front, rear, top, and bottom edges, and being operatively attached at their respective top edges to said top shading panel at said left and right side edges thereof, respectively, so as to each depend from the respective side edge thereof; and a front-to-rear main axis;

wherein said top shading panel and said left and right side shading panels are formed as a monolithic structure which is made of a rigid material having elastic memory;

wherein said left and right side shading panels have been formed in a manner such that, when in an unstressed position, their respective bottom edges are closer together than their respective top edges; and wherein when said computer monitor hood is in place on a computer monitor, a portion of said monitor facing surface of said top shading panel rests on a contacted portion of the top surface of the computer monitor, and said bottom edges of said left and right side shading panels are further apart than when in their unstressed position;

whereby, a portion of each of said monitor facing surfaces of said left and right side shading panels is biased into frictional contact with a portion of said left and right side surfaces, respectively, of the computer monitor as a consequence of said elastic memory attempting to restore said left and right side shading panels to their unstressed position, thereby permitting placement of said computer monitor hood on a computer monitor such that said top, left side, and right side shading panels each project further forwardly on the computer monitor than the computer monitor screen by a selected amount, so as to shade the computer monitor screen.

2. The computer monitor hood of claim 1, wherein said monolithic structure of said top, left side, and right side shading panels is formed of a plastics material having elastic memory chosen from the group consisting of polyethylene, polypropylene, copolymers of polyethylene and polypropylene, vinyl, acrylonitrile-butadiene-styrene, nylon, urethane, and mixtures thereof.

3. The computer monitor hood of claim 1, wherein said monolithic structure of said top, left side, and right side shading panels is formed of a plastic material which has been molded by a process chosen from the group consisting of injection molding, blow molding, and slush molding.

4. The computer monitor hood of claim 1, further comprising an elongate securing means to be passed around said top, left side, and right side shading panels when each of said left and right side shading panels has been forced into a position proximate said monitor facing surface of said top shading panel;

wherein said securing means has a hoop stress axis which, when said securing means is in place around said top, left side, and right side shading panels, said hoop stress axis is parallel to said front-to-rear main axis of said computer monitor hood;

whereby said computer monitor hood is maintained in a collapsed condition with said left and right side shading panels each being proximate said monitor facing surface of said top shading panel as a consequence of reactive hoop stress of said securing means acting against the elastic memory of the material of said computer monitor hood as it attempts to restore said left and right side shading panels to their unstressed position.

5. The computer monitor hood of claim 1, wherein a pair of creases are molded into said rigid material in the outer surfaces of said left and right side shading panels;

wherein one of said pair of creases is formed slightly below the intersection of said left side shading panel and said top shading panel, and the other of said pair of creases is formed slightly below the intersection of said right side shading panel and said top shading panel, respectively.

6. The computer monitor hood of claim 5, wherein said monolithic structure of said top, left side, and right side shading panels is formed of a plastics material having elastic memory chosen from the group consisting of polyethylene, polypropylene, copolymers of polyethylene and polypropylene, vinyl, acrylonitrile-butadiene-styrene, nylon, urethane, and mixtures thereof;

wherein said monolithic structure of said top, left side, and right side shading panels is molded by injection molding; and wherein said monolithic structure of said top, left side, and right side shading panels is molded in a configuration where said left side shading panel and said right side shading panel are proximate said monitor facing surface of said top shading panel, so as to present a substantially folded configuration when said left side and right side panels are in their unstressed position.

\* \* \* \* \*